Sept. 1, 1964  J. R. JOHNSON  3,146,873
DETEARING APPARATUS
Original Filed Aug. 21, 1959  4 Sheets-Sheet 1
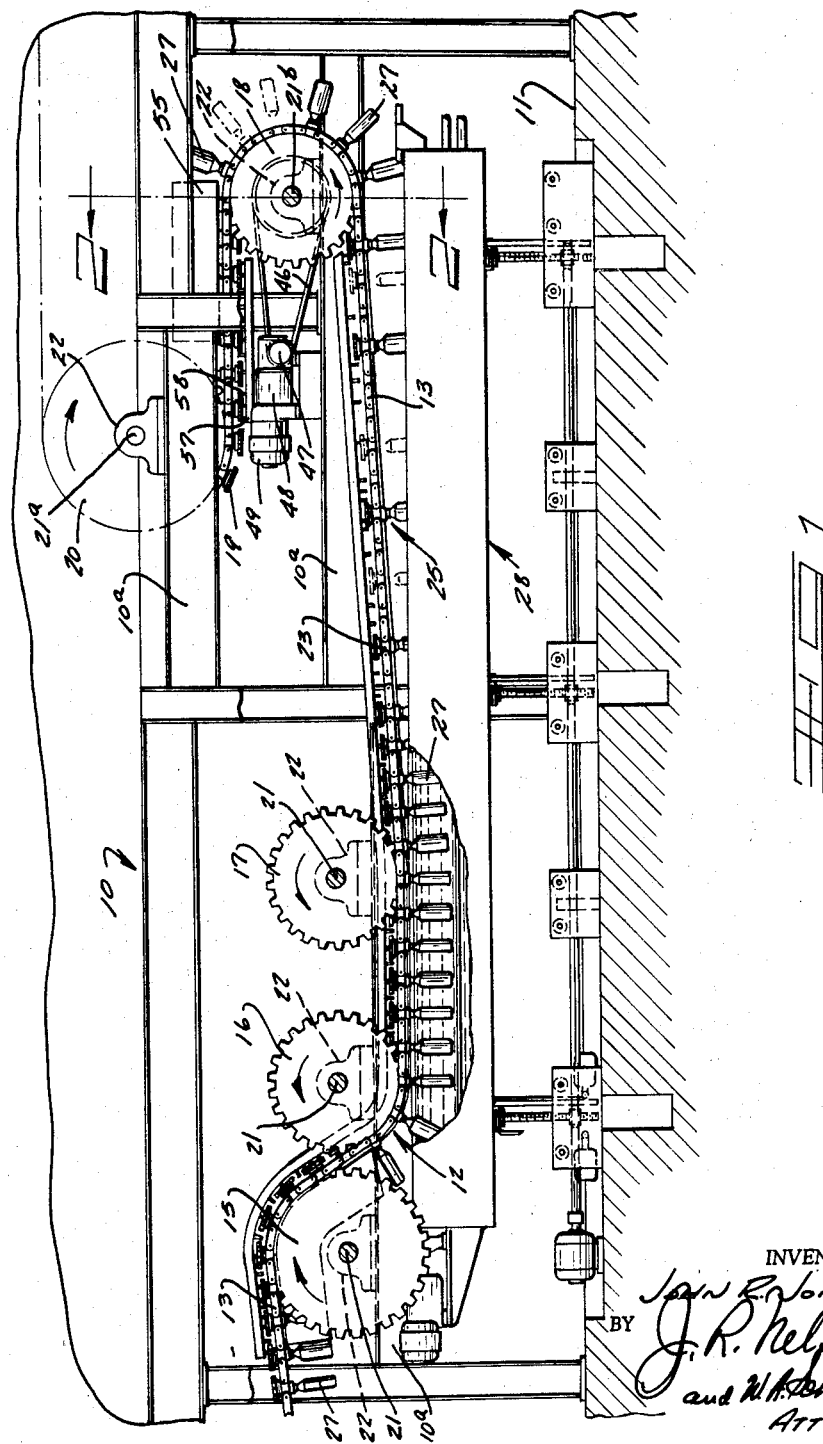
INVENTOR.
JOHN R. JOHNSON
BY
ATTORNEYS

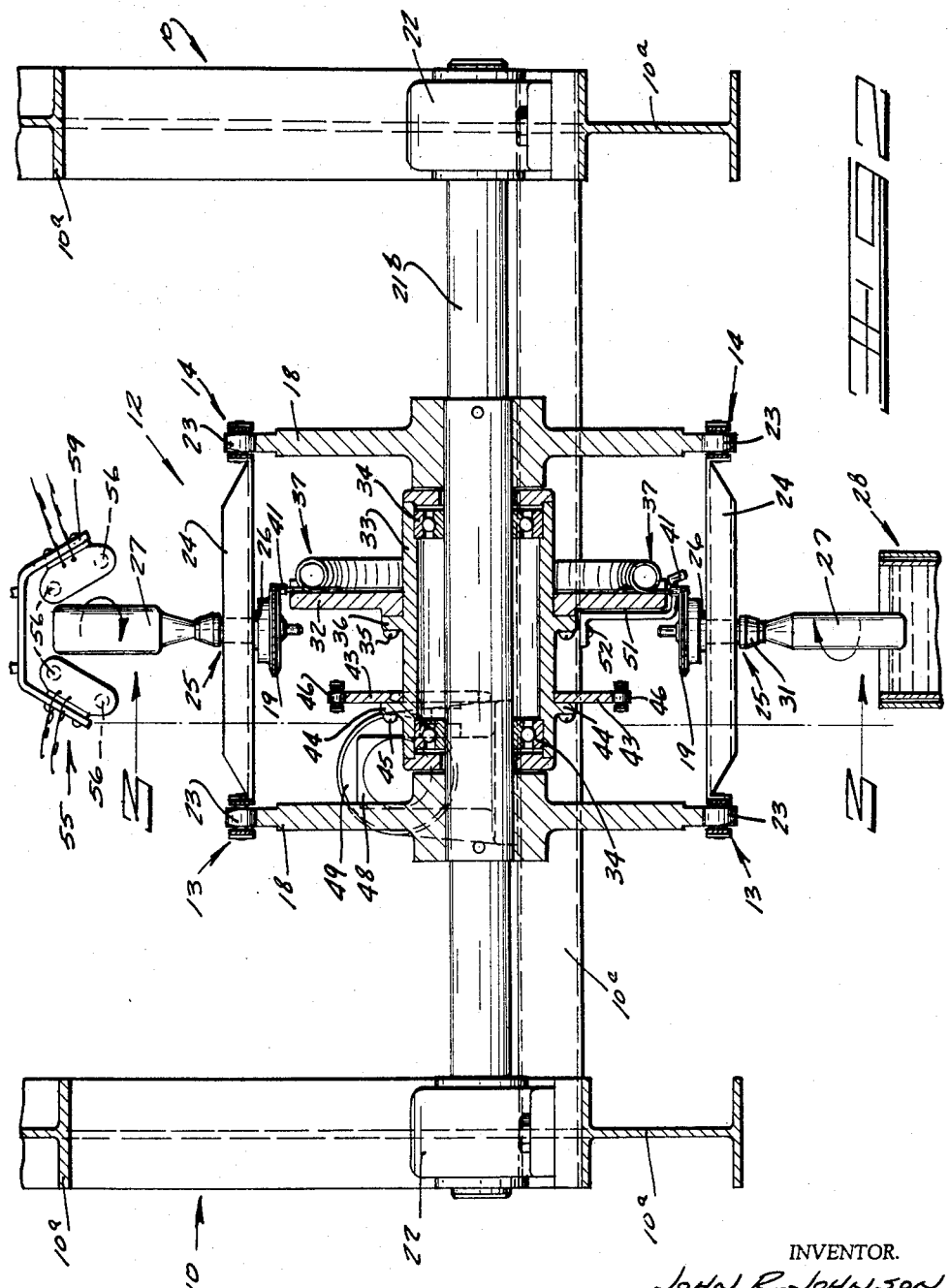

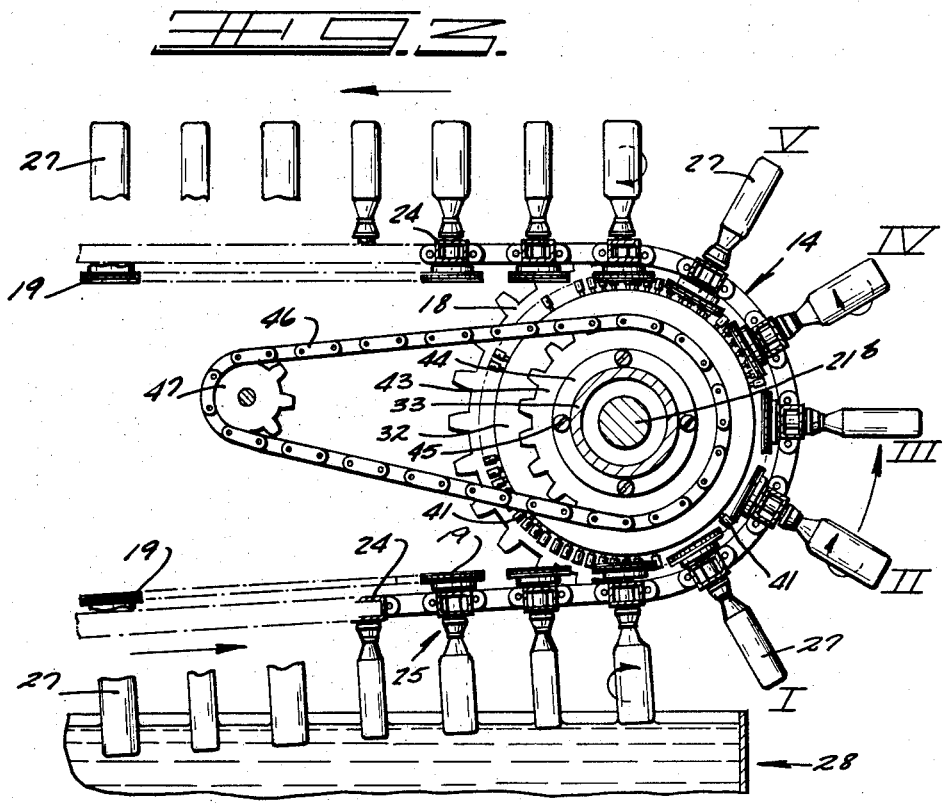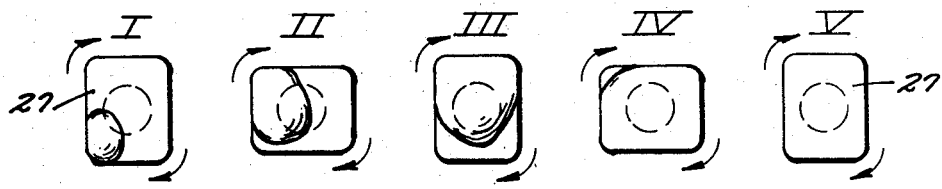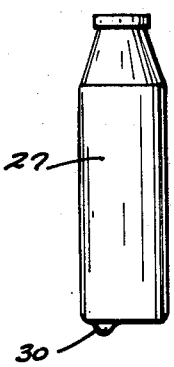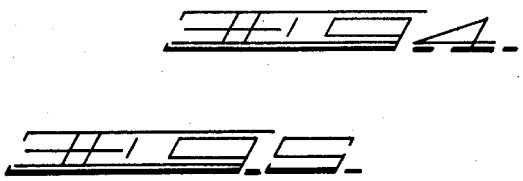

Sept. 1, 1964    J. R. JOHNSON    3,146,873
DETEARING APPARATUS
Original Filed Aug. 21, 1959    4 Sheets-Sheet 4
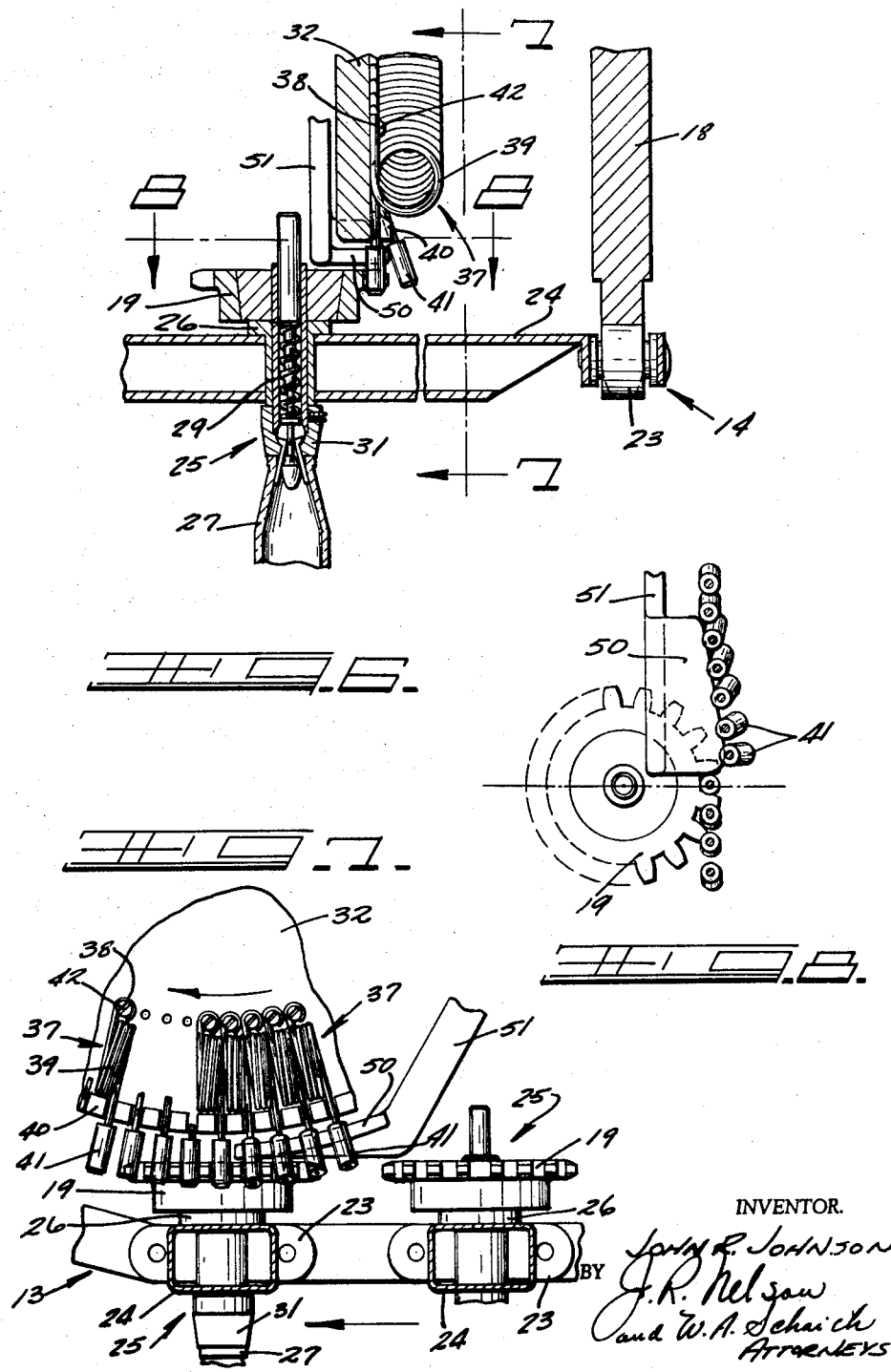
INVENTOR.
John R. Johnson
J. R. Nelson
and W. A. Schaich
BY
ATTORNEYS

United States Patent Office

3,146,873
Patented Sept. 1, 1964

3,146,873
DETEARING APPARATUS
John R. Johnson, Toledo, Ohio, assignor to Owens-Illinois Glass Company, a corporation of Ohio
Original application Aug. 21, 1959, Ser. No. 835,361. Divided and this application Oct. 20, 1960, Ser. No. 63,818
6 Claims. (Cl. 198—33)

The present invention relates to treating an article to obtain a smooth and attractive coating thereon by the application of a liquid coating material, and, more specifically, to apparatus for controlling the distribution of the liquid coating material after applied to cause any tear or droplet formation at the lowermost part of the article to flow or merge smoothly into the coating. This distribution control has been referred to in the art as "detearing," which term designates removal or elimination of the drop or drops of coating material that usually accumulate at the bottom of an article after the coating is applied and while it is still flowable.

The invention is applicable to the coating of articles of various kinds, sizes, and shapes with a wide range of coating materials, wherein the coating is applied in the liquid state and subsequently gels or sets. It has been developed in connection with the coating of glass containers such as bottles, jars, or the like, by dipping heated bottles into a bath of plastisol coating material and then curing the coating thereon by heat. Incident to lifting the coated bottles from this bath, a "tear drop" or blister-like spot substantially thicker than the adjacent areas forms at the point of final separation between the coating and a following string of the coating material which eventually breaks off and falls back into the bath. This "tear drop" must be removed, otherwise, the coating will make the bottle bottom unstable, irregular and unattractive and the bottle will lack utility as a commercially acceptable article. Furthermore, such removal must be effected rapidly and in an economical manner.

These "tear drop" formations have heretofore been dealt with by removal from the applied coating by wiping, but such is impractical because of its effect on the appearance of the coating, and also is uneconomical in a continuous manufacturing process. Detearing has also been performed by an electrostatic process, as set forth in the patents to Charles K. Gravely, U.S. Patent No. 2,359,476, and Harold K. Stoddard, U.S. Patent No. 2,640,459. In this latter process, the coated article is brought into a spaced relation with a detearing electrode, there being established between it and the article an electrical potential difference of high voltage. The resultant electrostatic field performs the detearing by actual removal or separation of coating material from the article, such removal of material being less desirable than elimination of the tear drop by merging it into and retaining it in the applied coating material. Furthermore, the process requires that either the coated article or coating serve as an electrode which requires either to be a conductor. In the case of articles which are poor conductors, such as glass articles, this process presents further shortcomings and is, therefore, not altogether universal and flexible. The equipment is relatively costly to operate and maintain, and inasmuch as it requires a potential difference on the order of 80,000 to 100,000 volts, has a potential electric shock hazard.

Accordingly, the prior art processes of detearing have relied on removal or separation of material from the coating after it is applied on the article.

It is, therefore, an important object of the present invention to retain and control the "tear" or last drop formed on the applied coating of the article by causing such to flow or merge smoothly into the coating.

It is also an object of this invention to provide a simple, safe, and economical apparatus for detearing a freshly coated article, regardless of the make-up of the article, by subjecting it to simultaneous plural rotational movements, whereby the coating is distributed smoothly over the article under the combined influence of surface tension and gravitational forces only.

Another object of the invention is the provision of a rapid and economical detearing of liquid coated articles by novel apparatus employed in a continuous manufacturing process which will obtain a smooth protective coating on the article and obtain improved control over the distribution of coating thereon.

And, a further object of the invention is to provide mechanical detearing in a continuous article-coating machine process that is performed automatically as part of the manufacturing process.

The above objects as well as other objects and advantages of the invention will be apparent to those skilled in the art from the following detailed description, taken in conjunction with the annexed sheets of drawings, on which is presented for purposes of illustration only, a preferred and practical embodiment of the invention.

FIG. 1 is an elevational view with parts broken away, showing the invention as employed on a machine having utility for the manufacture of vinyl resin coated glass articles, such as glass aerosol bottles.

FIG. 2 is an enlarged and sectional elevational view taken along lines 2—2 of FIG. 1, illustrating the novel detearing apparatus of the invention.

FIG. 3 is a detailed side sectional elevational view taken along lines 3—3 of FIG. 2, which also illustrates performance of detearing by the present invention.

FIG. 4 is a series of diagrammatic views of the bottles at various stages of detearing, corresponding to the numbered positions of FIG. 3, and illustrates the action of the tear drop at the bottom of the bottles as the bottles are treated according to detearing by the present invention.

FIG. 5 is an elevational view of a bottle being treated by the present invention and illustrates the tear drop formation along the bottom thereof as it exits subsequent to removal from the bath of liquid coating material after dipping, but prior to treatment by the method of the present invention for detearing that tear drop smoothly into the applied coating on the bottle.

FIG. 6 is an enlarged fragmentary sectional elevational view of the bottle chuck and the mechanism of the novel detearing apparatus, as shown in the lower portion of FIG. 2, which performs the function of rotating the bottle chuck and held bottle about their central axis. This figure also illustrates a novel mechanical feature of the invention for bringing the driving elements into driving engagement with the teeth of the driveable pinion on the bottle chuck without interference.

FIG. 7 is a fragmentary side elevational view taken along line 7—7 of FIG. 6.

FIG. 8 is a fragmentary plan view taken along lines 8—8 of FIG. 6.

This application is a divisional of my copending application Serial No. 835,361, filed August 21, 1959.

As a practical illustration of the invention, a preferred embodiment will now be described.

According to the illustrated preferred embodiment of the present invention, bottles are loaded to the bottle-coating machine by inserting them at their necks over the end of a holding chuck which grasps the bottle internally and holds it in place on the machine. A plurality of chucks are provided by mounting on the cross slats of an endless chain carriage. This carriage is moved through an established path of travel which presents the bottles at various stations throughout the machine for performing the various steps thereon to manufacture a plastisol coated glass aerosol bottle. As may be seen from the drawings, the bottles extend perpendicular to the path of the chain after they are chucked onto the machine.

Referring to FIG. 1, a structural machine frame 10 is supported by a floor 11. This figure shows, in part, a machine capable of continuous manufacture of plastisol coated articles, such as bottles, glass bobbins, and the like. It includes a movable carriage, indicated generally as 12, comprised of two parallel endless reaches of chain 13 and 14 (see also FIG. 2) which are in mesh successively with the teeth on pairs of parallel and spaced-apart sprockets 15, 16, 17, 18 and 20. The carriage is driven continuously from left to right on FIG. 1 by driving the sprockets 20 through any suitable driving connection. Each pair of the mentioned sprockets is keyed onto a horizontal shaft, as indicated by 21, 21a and 21b, all shafts being parallel. These shafts are each mounted in conventional journal boxes of the character shown at 22, which are supported on the horizontal members 10a of the frame 10. The chains 13 and 14 are made up of individual links, successively connected, the links engaging teeth of the sprocket. Intermediate the sprockets, the chains are guided in fixed straight spans of travel in U-shaped guide channels (not shown) which are mounted on the machine frame. At equally spaced distances along the chains 13 and 14 are included in their make-up special links 23 (FIG. 2), constructed for fastening cross bars 24 which are disposed parallel to each other and extend between the chains 13 and 14, the combination of the chains 13 and 14, these special links 23 therein, and the cross bars 24, comprise the movable carriage means.

As indicated, the path of travel of the chains is defined by the sprockets and guide channels. The plurality of bottle chucks indicated as 25 are rotatably mounted in the cross bars 24 by a bushing 26 rigidly fabricated to the latter. As mentioned, this mounting disposes the chucks perpendicularly, so that they depend outwardly from the cross bars and carry the chuck bottles with the central axis of the latter being disposed at right angles to the path of travel of the movable carriage. The structural details of the chucks 25 are fully set forth in my U.S. Patent 2,882,061. The bottles illustrated on the drawings, and hereafter referred to individually and collectively by numeral 27, are illustrated as to shape as having rectangularly shaped body portions and an integral upper neck portion (see FIG. 5). This shape of bottle is generally referred to in the trade as a "panel." Various shapes and sizes of bottles, as well as other articles or work pieces, may be treated under the present invention. The specific shape of the bottle has no specific bearing or restriction on the invention.

The drawings herein disclose, for the sake of simplicity of illustration, one longitudinal line of the chucks 25 aligned successively on the cross bars 24 of the carriage means. However, any number of lines may be constructed and accommodated by the carriage means within the limits of the lateral space available between the pairs of sprockets which obviously define the spacing between the chains 13 and 14. In actual practice, I have found that four lines of chucks are satisfactory, and it is contemplated that eight lines would be practical.

The just described carriage means is movable continuously in one direction by any suitable drive means, such as an electric motor and geared speed reduction unit (not shown), the latter being drivably connected through a coupling to drive the shaft 21a mounting the sprockets 20. The drive is operated so that sprockets 20 are driven in the clockwise direction, as viewed on FIG. 1, causing the chucks 25 and their chucked bottles 27 to be moved from left to right through the dipping tank 28. In the operation of the machine, the bottles as they are advanced in a downwardly inclined path defined by the periphery of the sprockets 16 are moved into the liquid coating material contained in the dip tank apparatus 28, and are subsequently brought into a "full dip," and thereafter moved in a horizontal path between sprockets 16 and 17. As the carriage advances the bottles beyond sprocket 17, their path of movement is gradually inclined upwardly toward the periphery of the sprockets 18. In such a fashion, the bottles are gradually removed from their full dip elevation and out of the bath of material in the tank, whereupon they travel for a short distance over the tank. During this latter-mentioned short span of travel, excess material will drip or run from the bottles back to the tank until a point of final separation between the stream of coating material which runs off and falls into the bath and the coating material remaining on the bottle. At this stage, a tear drop or blister-like spot forms near a bottom edge of the bottle substantially as illustrated by the reference numeral 30 on FIG. 5. As previously pointed out herein, the elimination of this tear drop on the applied coating by the present invention is next accomplished in the treating process.

The foregoing being given as an illustration of the treatment of the bottle for applying a coating liquid coating material thereto, the bottle is next subjected to the detearing method of this invention, this method being performed by the presently described novel form of apparatus. In this connection, it should be understood that various other forms of apparatus could adequately perform this method, or even though it would be less convenient, such method could be performed by hand manipulation. It should also be understood that the present detearing method will be practical and operate very satisfactorily, regardless of the manner by which the coating is applied to the bottle or work piece. In this respect, the method will satisfactorily detear articles coated by spraying, flooding, etc., as well as by the illustrated dipping technique.

As the carriage means 12 passes around the sprockets 18, it travels through a defined arcuate reversing segment of its path which, in effect, inverts the bottles 27 from their substantially vertical attitude or position at the lower side of the sprockets 18 to an inverted vertical position at the upper side of these sprockets. This, in effect, amounts to moving the bottles bodily in a rotation about a horizontal axis defined by the shaft 21b for the sprockets 18.

Accompanying this rotational bodily movement, the bottles are simultaneously rotated about their longitudinal axis. This is accomplished in the embodiment of the invention disclosed on the drawings by the following mechanism.

Referring briefly to FIG. 6, it is seen that the bottle chucks 25 are provided with the bushing 26 held in the cross bar 24. Journaled in the bushing 26 is a body member 29 which has a rigidly attached lower gripper head 31 and an upper pinion 19. The parts 29, 31, and 19 are thus rotatable within the bushing 26 about the central axis of the chuck.

Referring now to FIGS. 2 and 3, it is seen that an annular wheel or disk member 32 is rotatably mounted with respect to the shaft 21b by a spider 33 carried on roller bearings 34, the spider being thus mounted in place on the shaft 21b between the sprockets 18. The disk member 32 is fastened to the spider 33 by cap screws 35 extending through the annular flange 36 of the spider member. The disk 32 and spider 33 thus assembled form the hub portion of a gear. The disk member, therefore, is mounted on the shaft 21b for rotation independent of the shaft, the latter being driven by the sprockets 18 as the carriage chains 13 and 14 are moved therearound. On the disk member 32 is provided a plurality of yieldable pin assemblies 37.

By referring to FIGS. 6–8, as well as FIG. 2, it is seen that each of the pin assemblies 37 is constructed as follows: An upper looped end 38 forms an eyelet by which each assembly 37 is fastened to the disk member 32. Extending from the eyelet 38 is a length of tubular spring steel that is wound as a coil spring body portion 39 which ultimately straightens and extends radially along the disk member through a pair of adjacent slot-defining projections 40 at the periphery of the latter. At the outer end of these coiled body portions 39 is a rotatably mounted cylindrical pin 41. These pins 41 are of a size that will correspond with and mesh in the gear teeth of the pinion 19 of each of the chucks. Thus, as the carriage means moves the chucks and their pinions 19 through the reversing path defined by the sprockets 18, the pins 41 serve as teeth of a gear element in imparting rotation to the chuck pinions. The speed of this rotation will depend upon the relative rotation between the disk member 32 and the sprockets 18. The disk member 32 may be held stationary or may be independently rotated. When the disk member is rotated, such rotation is imparted through an annular sprocket 43 bolted to the projection 44 of the spider 33 by cap screws 45 (FIGS. 2 and 3). The sprocket 43 is driven through the endless drive chain 46 running over the drive gear 47 (see FIGS. 1 and 3). The drive gear 47 is mounted on the output shaft of a variable speed gear reduction unit 48 which is driven by a reversible electric motor 49 (the latter two elements shown in outline only on FIG. 1). The items numbered 48 and 49 just described are not herein disclosed in detail, since I have preferred to use a commercially available variable speed drive sold under the trade name of "Master Speed Ranger" by the Master Electric Company, St. Louis, Missouri.

By the use of the variable speed drive just described, the disk member 32 and its driving pins 41, which are comparable to gear teeth, may be rotated in either direction, and at any selected speed of rotation that may be needed for imparting the desired speed of rotation to the bottles through the pinions 19 of the chucks 25. For example, as the bottles are being rotated bodily about shaft 21b in a counter-clockwise direction (FIG. 3), the variable speed drive 48 and 49 may be operated to impart clockwise rotation to the disk member 32. This will rotate the bottles in a clockwise direction about their own central axis (shown by arrows on FIG. 3). Any desired speed of rotation of the bottles about their own axis may be obtained through adjustment of the speed of the driving disk 32 by the variable speed drive unit 48, 49. As will be noted from the just stated example of operation, the disk member 32 was rotated in a direction counter to the direction of the bodily movement of the chucks and bottles by the carriage means. This tends to multiply the bottle rotating speed. If, however, the disk member 32 is rotated in the counter-clockwise direction (FIG. 3), or in the same direction as the movement of the carriage, the speed relationship will be different. Through this latter direction of rotation of disk 32, the bottles may be rotated more slowly with a given drive speed of the drive gear 47. It should be readily understood, however, that any rotational speed combination may be obtained by this apparatus, and such speed variations are readily adjustable. Also, it should be readily understood without further description that the bottles may be rotated axially by holding the disk 32 stationary.

Another novel feature of the apparatus of the invention includes a means for bringing the above described pins 41 through their assemblies 37 into mesh with the teeth of the pinions 19 of the chucks 25. As described, each of the pins 41 is resiliently mounted so as to be yieldable in an axial direction relative to the disk member 32 which carries them. A cam element 50 is located in a fixed position on the machine. The cam 50 is rigidly attached to a bracket 51 which is bolted at 52 to the underside of a flange of the transverse I-beam support 10c of the machine frame. The cam 50 is located in spaced relationship just prior to the point where the pins 41 will come into mesh with the teeth of the pinions 19 of the chucks as the latter are carried into the reversing path of the sprockets 18. This cam terminates along a radial plane of the gear 32 and, as the diametrical center of the moving pinions arrive at a position in this plane, the pin-type teeth 41 will fall into mesh with the teeth of the pinion 19. This position is shown detailed on FIGS. 7 and 8. Thus, as the disk member 32 is rotating (on the figures, a clockwise direction), it carries the pins successively over the stationary cam 50, whereupon the coils 39 are tightened by the pins yielding laterally outwardly. As the pins 41 run off of the cam 50, the coils 39 spring the pins 41 laterally toward the gear teeth of the pinions 19 and they drop into mesh therewith. This construction prevents any interference between the pins and the gear teeth as they come into mesh, and, since the pins 41 are mounted resiliently, they are enabled to yield and slide into mesh in the event an initial interference or engagement is imminent. This feature decreases maintenance on the equipment and prolongs the operating life of the chucks.

Turning now to FIGS. 3–5, the detearing action will be explained. As the bottles advance from the bath of the liquid coating material, they are lifted from the bath until a point of final separation between the coating on the bottle and the material running back to the bath occurs. At this point, the tear drop or blister-like spot will be formed, as illustrated in FIG. 5. As the movement of the bottle advances in its reversing path around the sprockets 18 to the location indicated by numeral I on FIG. 3, this tear drop will appear at the bottommost edge of the bottle bottom. If the bottle at I is viewed from a point on a radius of the sprocket 18 coinciding with the central axis of the bottle, this tear drop will appear substantially as shown in the diagrammatic sketch numbered I on FIG. 4.

As the bottle advances to the point indicated by II in FIG. 3, the combined rotational movement of the bottle about the shaft 21b and its own central axis will have enlarged this tear drop to the extent shown diagrammatically in the sketch labeled II of FIG. 4. Subsequently, as the bottle advances to the stages indicated III, IV, and V, on FIG. 3, the tear drop will be progressively merged into the coating at the bottom of the bottle, as indicated diagrammatically in the sketches labeled III, IV, and V of FIG. 4, whereupon the tear drop is eliminated and merged into a smooth coating at the bottom of the bottle. The foregoing being but an illustrative example of how the detearing action of the present invention is accomplished, it should be understood that as between various liquid coating materials, sizes and shapes of bottles and rates of rotation of the bottle about both the aforementioned axes may accomplish the detearing action in a more rapid or less rapid fashion than is illustrated herein. It may not always be necessary to completely invert the bottles; however, it is believed that a substantial change of attitude of the bottle while it is undergoing rotation about its own axis is necessary. The illustration herein indicates that the movement of the bottle in its bodily rotation about the shaft 21b is accomplished through approximately 180° of rotation, which inverts the bottle from a substantially upright position to an inverted position. However, depending on the coating material and the article coated, this latter-mentioned bodily rotation about axis 21b may be carried out to a lesser extent yet accomplish the detearing objectives of the invention. In the preferred example illustrated, the bottles are inverted while travelling through the arcuate reversing path of the carriage primarily as an accommodation of the carriage path in the machine process.

After the bottles have been deteared, they are brought between a pair of spaced radiant heaters 55 which define a heating zone. These heaters may take the form, as is illustrated on FIG. 2, of electrical resistance heaters or "calrods" 56 held in frame 59 which radiate heat toward the bottles as they pass therebetween. Infrared lamps could likewise be used to supply the heat. As the bottles are passed between the heaters 55, they are rotated continuously by their chucks to apply the heat to the coating thereon uniformly. This is accomplished, as shown on FIG. 1, by having a rail 57 mounted on the machine frame so as to lie in a plane tangentially adjacent to the teeth of the pinions 19 of the chucks as they move through the heat-applying zone, just described. The rail 57 has a plurality of upwardly depending pins 58 which are spaced apart in the path of the teeth of the pinions 19 so as to coincide and mesh therewith. These pins may be likened, in effect, to a stationary set of rack gear teeth. As the chucks 25 are advanced through the heat-applying zone, these pins 58 mesh with the chuck pinions to rotate the bottles about their central axis. Heat is thus applied uniformly to the coated bottles sufficiently to set up the material of the coating until it is no longer flowable. Once a smooth and attractive coating is obtained through the foregoing detearing action and set up in the heat-applying zone, that coating is then attained on the article. Thereafter, the carriage will advance around the the sprockets 20 for subsequently handling and treating the bottles as the machine process may demand. As one operating example in which the present invention has been employed satisfactorily, bottles were coated by dipping in a bath of a vinyl resin dispersion, which bath was kept at a temperature of about 85° F. and the dispersion of a viscosity of about 8,000 centipoises. One specific example of a vinyl resin dispersion employed comprised 100 parts of polyvinyl chloride, 80 parts of diisooctyl phthalate, 1 part tin mercaptide, and a pigment ingredient to impart the desired color to the finished coating. The plastisol coated glass bottles were next successively given the detearing treatment according to the herein disclosed invention. The coating was then set, as just described, and the coated glass bottles thereafter heated to a temperature of about 400° F. in an oven for curing the set coating. Subsequently, the bottles were cooled so as to permit unloading and handling.

Modifications may be resorted to within the spirit and scope of the appended claims.

I claim:

1. The combination of a carriage means movable in an endless path, means in operative engagement with the carriage means defining therefor an arcuate reversing segment of said path, a plurality of article-holding chucks rotatably mounted on said carriage means, each said chuck having a rotatable driven element for rotating the chuck and article held thereon, driving means engageable with the driven element of the chucks as each of the latter are moved by the carriage means in said arcuate reversing segment of said path for rotating the chucks and article held thereby, and power means operatively connected for driving said driving means in either direction of rotation.

2. The combination of a carriage means movable in an endless path, means in operative engagement with the carriage means defining therefor an arcuate reversing segment of said path, a plurality of article-holding chucks rotatably mounted on said carriage means, each said chuck having a rotatable driven element for rotating the chuck and article held thereon, means engageable with the driven elements of the chucks during the movement in said arcuate reversing segment of the path of the carriage means for imparting rotation to the chucks and articles held thereby, and power means operatively connected for driving said last-named means in either direction of rotation.

3. The combination of a pair of spaced-apart, parallel, endless reaches of chains, a plurality of cross members attached to their ends to said chains for carriage thereby, a plurality of article chucks rotatably mounted on said cross members and holding articles thereon to depend substantially perpendicular from said cross members, each of said chucks including a pinion derivable for rotating a chucked article, a transverse shaft, a pair of sprockets on said shaft in running engagement respectively with said pair of chains, a spider coaxially mounted on said shaft and rotatable independently about said shaft, a gear means mounted on said spider for rotation therewith, said gear means comprising a hub and a plurality of spaced-apart radially depending teeth thereon constructed and arranged for meshing engagement with the teeth of the pinion of said chucks, said gear means and pinions meshing, as the pinions are successively moved toward said pair of sprockets, at a point where the central axis of each said pinion is aligned through a radius of the hub of said gear means, and a variable speed drive means operatively connected to drive said gear means.

4. The combination defined in claim 3 wherein said radially depending teeth of the gear means each comprise a cylindrical pin and a mounting means attached to the hub of the gear means and yieldable axially of the latter, said pin being rotatably mounted on said mounting means.

5. The combination in claim 4, wherein additionally is included a stationary cam constructed and arranged to engage said pins successively during rotation of said gear means prior to the point of their meshing with the teeth of the pinions for moving the pins axially through their said yieldable mounting means and out of meshing alignment with said pinions in the direction away from said pinions, said cam terminating adjacent to the said point of meshing the pins with the teeth of the pinions, whereat the pins are brought toward meshing engagement with the teeth of the pinion by their said yieldable mounting means.

6. The combination of a carriage means movable in an endless path, means in operative engagement with the carriage means defining thereby an arcuate reversing segment of said path, a plurality of article holding chucks rotatably mounted on said carriage means, each said chuck including a driven pinion adaptable for rotating an article held by the chuck about its own central axis, a gear comprising a central hub mounted for rotation, a plurality of yieldable bodies, means fastening said bodies at equally spaced distances circumferentially on said hub, said bodies depending laterally outwardly of said hub, a roller member mounted on each said depending body, said members in their aggregate being arranged to form axially yieldable teeth of said gear, means connected for rotating said gear, said gear being mounted to enable meshing of its said yieldable teeth with the teeth of said pinions as the latter are successively brought into their said arcuate reversing segment of the path of the carriage means, and a stationary cam engaging said roller members prior to the point of meshing with the teeth of said pinions causing said roller members to yield axially in a direction away from the pinions, said cam terminating whereupon to permit said rollers to mesh with the teeth of the pinions.

References Cited in the file of this patent

UNITED STATES PATENTS

| | | |
|---|---|---|
| 675,507 | Case | June 4, 1901 |
| 834,275 | Dorer | Oct. 30, 1906 |
| 2,508,259 | Helme | May 16, 1950 |
| 2,643,778 | Socke | June 30, 1953 |
| 2,693,872 | Baader | Nov. 9, 1954 |
| 2,800,803 | Bechman | July 30, 1957 |
| 2,939,330 | Margetts | June 7, 1960 |

FOREIGN PATENTS

| | | |
|---|---|---|
| 733,872 | Great Britain | July 20, 1955 |